United States Patent
Zheng et al.

(10) Patent No.: US 12,046,724 B2
(45) Date of Patent: Jul. 23, 2024

(54) METHOD FOR REASONABLY ADJUSTING END-OF-DISCHARGE VOLTAGE OF LITHIUM BATTERY WITH ATTENUATION OF BATTERY LIFE

(71) Applicant: UNIVERSITY OF SHANGHAI FOR SCIENCE AND TECHNOLOGY, Shanghai (CN)

(72) Inventors: Yuejiu Zheng, Shanghai (CN); Zheng Meng, Shanghai (CN); Yong Zhou, Shanghai (CN); Xin Lai, Shanghai (CN); Long Zhou, Shanghai (CN); Anqi Shen, Shanghai (CN); Wenkuan Zhu, Shanghai (CN); Yunfeng Huang, Shanghai (CN); Haidong Liu, Shanghai (CN)

(73) Assignee: UNIVERSITY OF SHANGHAI FOR SCIENCE AND TECHNOLOGY, Shanghai (CN)

( * ) Notice: Subject to any disclaimer, the term of this patent is extended or adjusted under 35 U.S.C. 154(b) by 560 days.

(21) Appl. No.: 17/284,446

(22) PCT Filed: May 9, 2020

(86) PCT No.: PCT/CN2020/089322
§ 371 (c)(1),
(2) Date: Apr. 10, 2021

(87) PCT Pub. No.: WO2021/184514
PCT Pub. Date: Sep. 23, 2021

(65) Prior Publication Data
US 2022/0149447 A1    May 12, 2022

(30) Foreign Application Priority Data
Mar. 17, 2020    (CN) .......................... 202010187854.0

(51) Int. Cl.
  H02J 7/00    (2006.01)
  H01M 10/44    (2006.01)
  H01M 10/48    (2006.01)

(52) U.S. Cl.
  CPC ........... *H01M 10/44* (2013.01); *H01M 10/48* (2013.01); *H02J 7/00302* (2020.01);
  (Continued)

(58) Field of Classification Search
  CPC .............. H02J 7/0048; H02J 7/007182; H02J 7/00714; H02J 7/00711; H02J 7/005;
  (Continued)

(56) References Cited

U.S. PATENT DOCUMENTS

2010/0072949 A1    3/2010    Kumashiro et al.
2014/0077769 A1*   3/2014    Maleki ................. H02J 7/0014
                                                        320/136

(Continued)

FOREIGN PATENT DOCUMENTS

| CN | 105742738 A | 7/2016 |
|----|-------------|--------|
| CN | 106546921 A | 3/2017 |

(Continued)

OTHER PUBLICATIONS

International Search Report in PCT/CN2020/089322 issued by ISA, dated Nov. 26, 2020.

(Continued)

*Primary Examiner* — Binh C Tat
(74) *Attorney, Agent, or Firm* — Zhu Lehnhoff LLP

(57) ABSTRACT

The present invention provides a method for reasonably adjusting an end-of-discharge voltage of a lithium battery with attenuation of a battery life. The method includes: acquiring an end-of-charge voltage, an end-of-discharge voltage and a rated capacity based on a basic parameter table for a lithium battery, then setting a safety end-of-charge (Continued)

voltage and a safety end-of-discharge voltage to obtain an initial safety discharge capacity, and finally setting a preset discharge capacity of the battery; using an Ampere-hour integration method to estimate a discharged power, taking the preset discharge capacity as a discharge standard, and stopping discharge when the discharged power reaches the preset discharge capacity; and the safety discharge capacity being gradually less than the preset discharge capacity within a battery life cycle, and the battery stopping discharge when the voltage reaches the safety end-of-discharge voltage. By controlling the discharge capacity to be unchanged, the present invention ensures stably outputting power in the case that the battery capacity attenuates, so that a user feels that the endurance mileage of an electric vehicle is stably unchanged within a certain period. The method has the characteristics of simple adjusting control method and convenience in commercialization.

3 Claims, 3 Drawing Sheets

(52) U.S. Cl.
CPC ...... *H02J 7/00306* (2020.01); *H02J 7/00716* (2020.01); *H02J 7/007182* (2020.01)

(58) Field of Classification Search
CPC ................. H02J 7/00712; H02J 7/0071; H02J 7/007194; H02J 7/00; H02J 7/0063; H02J 7/0049; H02J 7/0013; H02J 7/0016; H02J 7/0047; H02J 7/04; H02J 7/0014; H02J 2207/20; H02J 7/007192; H02J 7/02; H02J 7/00034; H02J 7/0068; H02J 7/0069; H02J 7/00036; H02J 7/00306; H02J 7/0042; H02J 7/06; H02J 7/345; H02J 7/0025; H02J 7/00309; H02J 2207/10; H02J 7/00043; H02J 7/00302; H02J 7/00304; H02J 7/0045; H02J 7/2434; H02J 2300/28; H02J 7/00032; H02J 7/007188; H02J 7/00308; H02J 7/0044; H02J 7/007184; H02J 7/1492; H02J 7/35; H02J 9/061; H02J 7/0029; H02J 7/342; H02J 2207/40; H02J 2300/24; H02J 2300/40; H02J 3/381; H02J 50/12; H02J 7/00716; H02J 7/34; H02J 2310/16; H02J 2310/22; H02J 50/10; H02J 50/402; H02J 50/80; H02J 50/90; H02J 7/00047; H02J 7/0019; H02J 7/0024; H02J 7/0031; H02J 7/007; H02J 7/1423; H02J 13/00002; H02J 13/00022; H02J 2310/46; H02J 3/003; H02J 3/32; H02J 7/00041; H02J 7/0032; H02J 7/007186; H02J 7/1446; H02J 9/068; H02J 2207/30; H02J 7/0036; H02J 3/38; H01M 10/0525; H01M 2010/4271; H01M 10/44; H01M 2010/4278; H01M 4/525; H01M 50/569; H01M 10/488; H01M 10/4228; H01M 16/006; H01M 12/08; H01M 10/052; H01M 10/4257; H01M 10/482; H01M 4/13; H01M 6/5044
USPC ................................................. 320/135–148
See application file for complete search history.

(56) References Cited

U.S. PATENT DOCUMENTS

2017/0338668 A1* 11/2017 Sada .................. H02J 3/32
2018/0358661 A1* 12/2018 Yebka ................ H01M 10/44

FOREIGN PATENT DOCUMENTS

| CN | 109088114 A | 12/2018 |
| CN | 109116258 A | 1/2019 |
| CN | 107482269 B | 1/2020 |

OTHER PUBLICATIONS

Written Opinion of the International Search Report in PCT/CN2020/089322, issued by ISA, dated Nov. 26, 2020.

* cited by examiner

| Item | Performance index | Item | Performance index |
| --- | --- | --- | --- |
| Rated capacity | 3Ah | End-of-charge voltage | 4.2V |
| Standard charge current | 0.9A | End-of-discharge voltage | 2.5V |
| Standard discharge current | 0.61A | Recommended charge method | Constant current-constant voltage |
| Use temperature range | −25~60°C | Recommended discharge method | Constant current |

FIG.2

METHOD FOR REASONABLY ADJUSTING END-OF-DISCHARGE VOLTAGE OF LITHIUM BATTERY WITH ATTENUATION OF BATTERY LIFE

TECHNICAL FIELD

The present invention relates to the technical field of lithium batteries, and more particularly relates to a method for reasonably adjusting an end-of-discharge voltage of a lithium battery with attenuation of a battery life.

BACKGROUND

With the development of science and technology and the progress of the time, the most important thing is the enhancement of awareness of the world's environmental protection and the urgent need of the global environment. Electric vehicles have represented the general trend and attracted the attention of more and more people, and gradually become a commonplace. The most important part of an electric vehicle is a battery, and lithium batteries have become the mainstream. For the long-term development of electric vehicles, researches on the life and endurance of the lithium batteries are even more important.

In the prior art, the lithium batteries will inevitably attenuate. As a battery attenuates, the endurance of a vehicle continues to decline. The main reason for this problem is the discharge mode of batteries in the existing market. During discharging, a voltage drops from an end-of-charge voltage to a fixed end-of-discharge voltage. A new battery can guarantee release of a rated capacity, with good performance. Related technologies have been maturely applied to the market. However, as the battery capacity attenuates, the actual discharge capacity will become less and less, and the battery performance will gradually decline. What is manifested is the decline in the endurance of the vehicle, further leading to worse and worse user experience.

SUMMARY OF THE INVENTION

The object of the present invention is to provide a method for reasonably adjusting an end-of-discharge voltage of a lithium battery with attenuation of a battery life to ensure stably outputting power in the case that the battery capacity attenuates.

In order to achieve the above object, the technical solution used by the present invention is: a method for reasonably adjusting an end-of-discharge voltage of a lithium battery with attenuation of the battery life. The method includes:

Step I, acquiring an end-of-charge voltage, an end-of-discharge voltage and a rated capacity based on a basic parameter table for a lithium battery, then setting a safety end-of-charge voltage and a safety end-of-discharge voltage to obtain an initial safety discharge capacity, and finally setting a preset discharge capacity of the battery;

Step II, using an Ampere-hour integration method to estimate a discharged power, taking the preset discharge capacity as a discharge standard, and stopping discharge when the discharged power reaches the preset discharge capacity; and Step III, the safety discharge capacity being gradually less than the preset discharge capacity within a battery life cycle, and the battery stopping discharge when the voltage reaches the safety end-of-discharge voltage.

In the step I, the set safety end-of-charge voltage $U_{S,C}$ is less than the end-of-charge voltage $U_{C,C}$, and the set safety end-of-discharge voltage $U_{S,D}$ is greater than the end-of-discharge voltage $U_{C,D}$;

power released from the safety end-of-charge voltage $U_{S,C}$ to the safety end-of-discharge voltage $U_{S,D}$ is a safety discharge capacity $C_S$. The safety discharge capacity $C_S$ is gradually decreased with the attenuation of the battery. When the battery does not attenuate, the safety discharge capacity $C_S$ is equal to the initial safety discharge capacity $C_{S,O}$;

the preset discharge capacity is selected to be $C_P = k \cdot C_{S,O}$.

In the step II, the method for using the ampere-hour integration method to estimate the discharged power is as follows:

discharged power $C_a = \int_0^{t_1} I(t)dt$;

wherein in case of $t=0$, the voltage of the battery is the safety end-of-charge voltage $U_{S,C}$. At $t_1$, the discharge capacity of the battery just reaches the preset discharge capacity $C_P$;

when the discharged power reaches the preset discharge capacity, the discharge is stopped, and the end voltage at this time is a new end-of-discharge voltage $U_{P,D}$; and when the battery does not attenuates, there is $U_{P,D} = U_{P,D,O}$, thereby obtaining $U_{S,D} \leq U_{P,D} \leq U_{P,D,O}$.

In the step 3, as the battery attenuates, the safety discharge capacity $C_S$ is gradually decreased. In order to ensure that the power discharged by the battery at each time can reach the preset discharge capacity $C_P$, it is selected to gradually reduce the $U_{P,D}$, and the $U_{P,D}$ is gradually reduced from $U_{P,D,O}$ to $U_{S,D}$;

when the voltage of the battery reaches $U_{S,D}$, the battery will stop discharge, and the discharge capacity at the moment is less than or equal to the preset discharge capacity.

A proportion coefficient k is greater than 0 and less than 1; a larger k value can be selected when the battery needs to have a larger utilization rate; similarly, a smaller k value can be selected when the battery needs to have a low discharge capacity.

Compared with the prior art, the present invention has the advantages:

(1) The adjusting control method is simple and efficient. The method for reasonably adjusting an end-of-discharge voltage of a lithium battery with attenuation of a battery life provided by the present invention can achieve the purpose of ceaselessly adjusting the end-of-discharge voltage by means of performing, according to the obtained real-time current data, calculation and comparison.

(2) The user experience is enhanced, and commercial use is facilitated. The method for reasonably adjusting an end-of-discharge voltage of a lithium battery with attenuation of a battery life provided by the present invention can effectively ensure stably outputting power in the case that the battery capacity attenuates, and brings a good use experience to a user. Good user experience and feedback are important standards for checking whether a product is suitable for the market, and enterprises do not need to have additional cost. This is win-win for the users and the enterprises.

BRIEF DESCRIPTION OF THE DRAWINGS

FIG. 2 is a basic parameter table of a battery in a battery attenuation experiment in the embodiment of the present invention.

DETAILED DESCRIPTION OF THE PREFERRED EMBODIMENTS

The technical solution adopted by the present invention will be further described below in combination with schematic diagrams.

Figure 1:
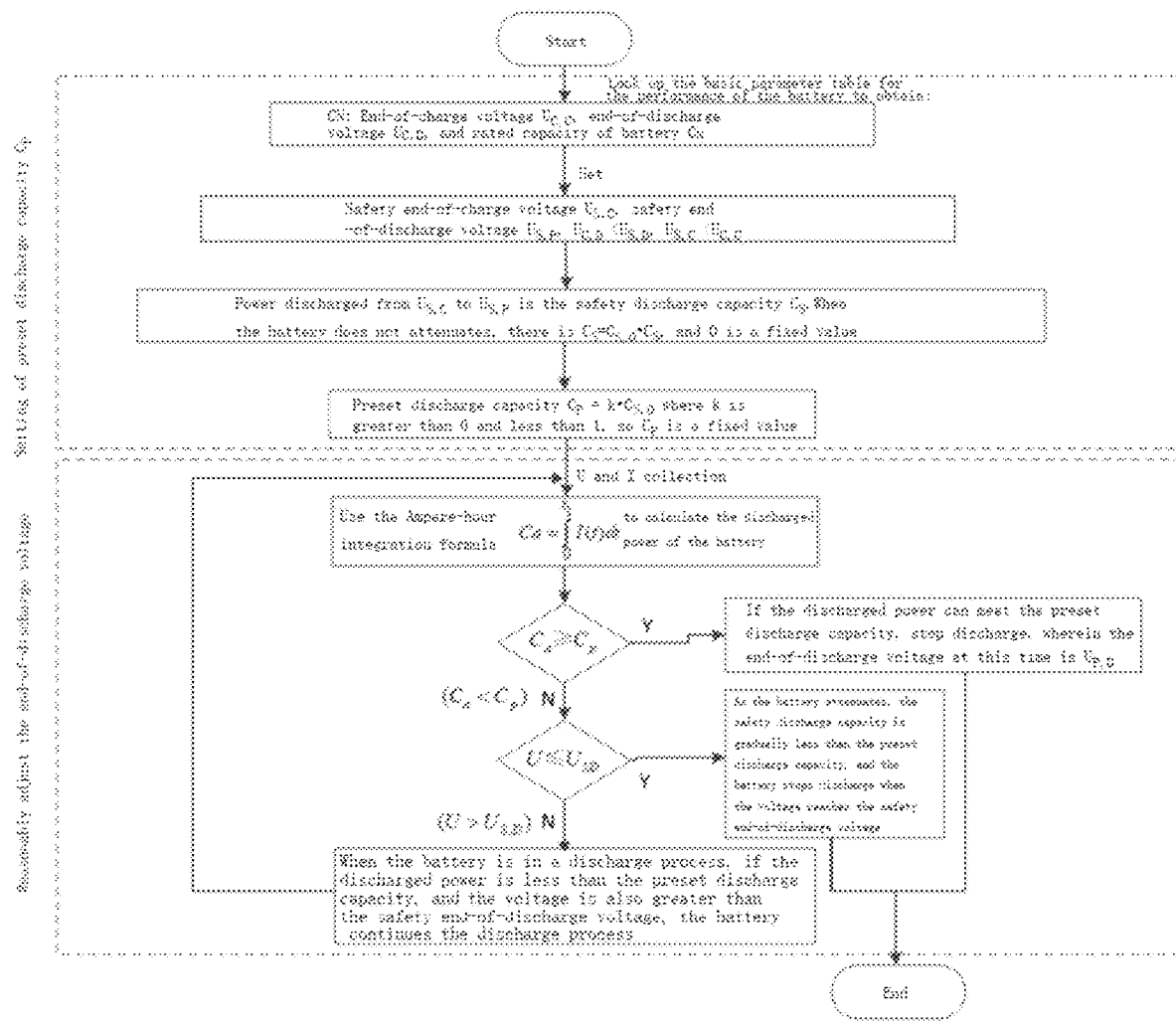
FIG. 1 is a flow chart of a method for reasonably adjusting an end-of-discharge voltage of a lithium battery with attenuation of the battery life in the embodiment of the present invention.

FIG. 1 is a flow chart of a method for reasonably adjusting an end-of-discharge voltage of a lithium battery with attenuation of the battery life. The present invention uses dynamic data of voltage and current of a lithium battery collected by a battery management system (BMS) to determine, according to an Ampere-hour integration method, a real-time discharge capacity of the battery, thereby determining a new end-of-discharge voltage. A detailed description is made below in combination with specific embodiments and corresponding lithium battery life cycle experiments.

The method for reasonably adjusting an end-of-discharge voltage of a lithium battery with attenuation of the battery life includes the following steps:

Step I, it is determined that an end-of-charge voltage $U_{C,C}$ is 4.2 V, an end-of-discharge voltage $U_{C,D}$ is 2.5 V, and a rated capacity $C_N$ is 3 Ah according to a basic parameter table for a lithium battery shown in FIG. 2. At this time, a safety end-of-charge voltage $U_{S,C}$ is set to be 4.15 V, and a safety end-of-discharge voltage $U_{S,D}$ is set to be 2.8 V. They obviously meet a quantitative relation. Power released from the safety end-of-charge voltage $U_{S,C}$ to the safety end-of-discharge voltage $U_{S,D}$ is called a safety discharge capacity $C_S$. The safety discharge capacity $C_S$ would be gradually decreased with the attenuation of the battery. When the battery does not attenuate, the initial safety discharge capacity is $C_S = C_{S,O}$. It can be known from test data that $C_{S,O}$ is equal to 3105 mAh. K is 0.8454 according to a requirement, so the preset discharge capacity is $C_P = k \cdot C_{S,O} = 0.8454*3105 = 2625$ mAh.

Figure 3:
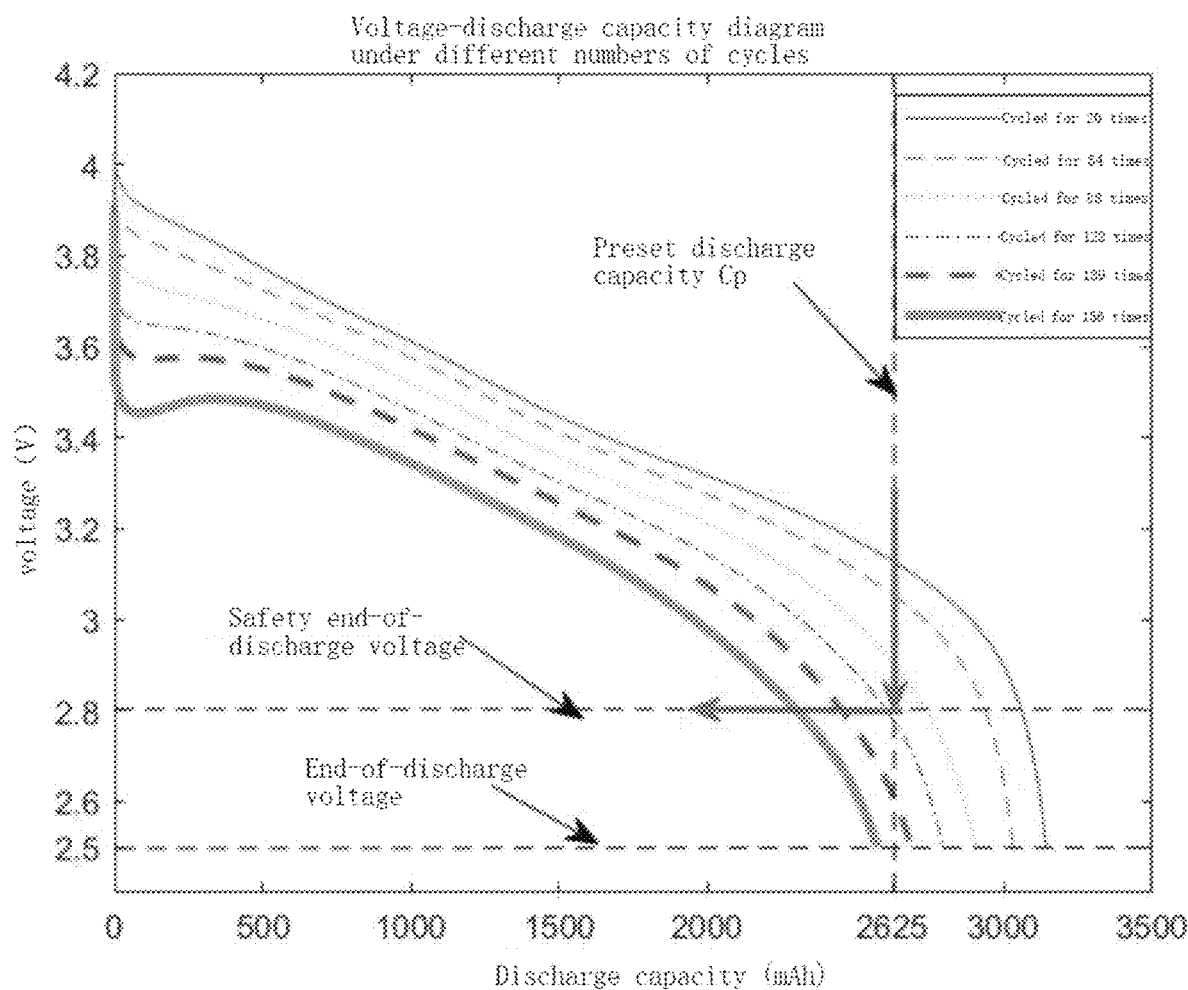
FIG. 3 is a battery voltage-capacity diagram under different numbers of cycles of a battery attenuation experiment in the embodiment of the present invention.

Step II, it can be known according to FIG. 3 that as the number of attenuations increases, the discharge capacity of the battery is gradually decreased when the end-of-discharge voltage appears. The discharged power can be calculated according to the Ampere-hour integration method. Discharge is stopped when the discharged power reaches the preset discharge capacity. It can be seen from S1 that $C_P$ is equal to 2625 mAh. An auxiliary line of $C_P = 2625$ mAh is made in FIG. 3. It can be apparently seen that when the discharge capacity reaches the preset discharge capacity, the voltage of the battery is gradually decreased as the number of cycles increases. After 20, 54, and 88 cycles, voltages corresponding to the preset discharge capacity are respectively 3.1287 V, 2.9383 V and 2.9048 V. Therefore, $U_{P,D}$ is reduced from 3.1287 V to 2.9383 V and further to 2.9048 V.

Step III, as the battery continues to attenuates, the battery will reach a critical value; when the discharged power reaches the preset discharge capacity $C_P = 2625$ mAh, the end voltage is just equal to the safety end-of-discharge voltage $U_{S,D}$. The $U_{S,D}$ of the present embodiment is 2.8 V, and two end conditions are triggered at the same time. As the battery further attenuates, the battery will cross this critical value. Hereafter, the discharge capacity of the battery would not reach the preset discharge capacity. When the voltage reaches the safety end-of-discharge voltage $U_{S,D}$, the battery stops discharge.

It can be found through the above content that the method and process for adjusting the end-of-discharge voltage of the present invention can be clearly understood, and are mainly divided into two stages as the battery attenuates. When the discharge capacity can meet the preset discharge capacity, the preset discharge capacity is used as an end condition to stop discharge; when the discharge capacity is less than the preset discharge capacity, it is apparent for the voltage to reach the safety end-of-discharge voltage at first, and the safety end-of-discharge voltage is used as an end condition to stop discharge.

The above is only a preferred embodiment of the present invention, and does not play any limitation role to the present invention. Equivalent replacement or modification and other changes in any form which are made by any person skilled in the art to the technical solution and technical content disclosed in the present invention without departing from the present invention shall not depart from the content of the technical solution of the present invention, and still fall within the protection scope of the present invention.

The invention claimed is:

1. A method for adjusting an end-of-discharge voltage of a lithium battery comprising:
   determining an end-of-charge voltage, an end-of-discharge voltage, and a rated discharge capacity of a lithium battery based on a basic parameter table for the battery;
   setting a safety end-of-charge voltage which is less than the end-of-charge voltage and a safety end-of-discharge voltage which is greater than the end-of-discharge voltage of the battery;
   determining an initial safety discharge capacity $C_S$ of the battery from the safety end-of-charge voltage to the safety end-of-discharge voltage;
   setting a preset discharge capacity of the battery using the formula $C_P = k \times C_S$ wherein k is a coefficient greater than 0 and less than 1;
   discharging the battery from the safety end-of-charge voltage while measuring the battery voltage and the battery current output by the battery during discharge;
   calculating the battery output in Ampere-hours using the Ampere-hour integration method in which the measured battery current is integrated with respect to time starting from when the measured battery voltage is the safety end-of-charge voltage; and
   ending discharge of the battery upon the occurrence of whichever of the following two events (a) and (b) occurs first:
   (a) the calculated battery output in Ampere-hours of the battery reaches the preset discharge capacity and the measured battery voltage is at least the safety end-of-discharge voltage; and
   (b) the measured battery voltage reaches the safety end-of-discharge voltage.

2. The method according to claim 1 wherein the coefficient k depends upon an expected discharge rate of the battery.

3. A method for setting an end-of-discharge condition of a lithium battery during multiple charging and discharge cycles comprising:

determining an end-of-charge voltage, an end-of-discharge voltage, and a rated discharge capacity of a lithium battery based on a basic parameter table for the battery;

setting a safety end-of-charge voltage which is less than the end-of-charge voltage and a safety end-of-discharge voltage which is greater than the end-of-discharge voltage of the battery;

determining an initial safety discharge capacity $C_S$ of the battery from the safety end-of-charge voltage to the safety end-of-discharge voltage;

setting a preset discharge capacity of the battery using the formula $C_P = k \times C_S$ wherein k is a coefficient greater than 0 and less than 1;

performing repeated cycles of charging and discharging the battery;

in a first plurality of the charging and discharging cycles, measuring the battery voltage and the current output from the battery while discharging the battery from the safety end-of-charge voltage, determining the discharged Ampere-hours of the battery using the Ampere-hour integration method in which the measured current is integrated with respect to time starting from when the measured battery voltage is the safety end-of-charge voltage, and ending discharge of the battery when the measured voltage of the battery is at least the safety end-of-discharge voltage and the discharged Ampere-hours of the battery reaches the preset discharge capacity; and in a second plurality of the charging and discharging cycles subsequent to the first plurality of the charging and discharging cycles, ending discharge of the battery when the measured voltage of the battery reaches the safety end-of-discharge voltage without the discharged Ampere-hours of the battery reaching the preset discharge capacity.

\* \* \* \* \*